(12) United States Patent
Hokuto et al.

(10) Patent No.: US 7,962,275 B2
(45) Date of Patent: Jun. 14, 2011

(54) CONTROL DEVICE AND CONTROL METHOD FOR INTERNAL COMBUSTION ENGINE

(75) Inventors: Hiroyuki Hokuto, Numazu (JP); Shigeki Miyashita, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 191 days.

(21) Appl. No.: 12/373,153

(22) PCT Filed: Dec. 21, 2007

(86) PCT No.: PCT/IB2007/004058
§ 371 (c)(1),
(2), (4) Date: Jan. 9, 2009

(87) PCT Pub. No.: WO2008/078162
PCT Pub. Date: Jul. 3, 2008

(65) Prior Publication Data
US 2009/0210138 A1 Aug. 20, 2009

(30) Foreign Application Priority Data
Dec. 21, 2006 (JP) ................................. 2006-343815

(51) Int. Cl.
*B60T 7/12* (2006.01)
(52) U.S. Cl. ......... 701/104; 123/434; 123/435; 123/674
(58) Field of Classification Search .................. 701/103, 701/104, 105, 110; 123/434, 435, 673, 674, 123/679
See application file for complete search history.

(56) References Cited

U.S. PATENT DOCUMENTS

| | | | |
|---|---|---|---|
| 5,794,604 A * | 8/1998 | Suzuki et al. | 123/673 |
| 5,839,415 A * | 11/1998 | Suzuki et al. | 123/491 |
| 6,325,052 B1 * | 12/2001 | Mashiki | 123/520 |
| 6,332,456 B2 * | 12/2001 | Mashiki | 123/520 |
| 2004/0069273 A1 | 4/2004 | Visser et al. | |
| 2005/0188948 A1 | 9/2005 | Miura | |
| 2010/0070159 A1 * | 3/2010 | Iwahashi et al. | 701/105 |

FOREIGN PATENT DOCUMENTS

| | | |
|---|---|---|
| JP | 60 178933 | 9/1985 |
| JP | 61-105408 | 7/1986 |
| JP | 63 143360 | 6/1988 |
| JP | 64-69768 | 3/1989 |
| JP | 1-147144 | 6/1989 |
| JP | 2-23226 | 1/1990 |
| JP | 3-111635 | 5/1991 |

(Continued)

*Primary Examiner* — John T Kwon
(74) *Attorney, Agent, or Firm* — Oblon, Spivak, McClelland, Maier & Neustadt, L.L.P.

(57) ABSTRACT

A control device for an internal combustion engine includes a fuel injection device that injects a fuel in accordance with a required injection amount that is required for combustion in a combustion chamber that is performed to produce an output of the internal combustion engine, and a fuel property specific determination device that specifically determines a fuel property of the fuel injected. The control device further includes a control device that performs an output correction process of controlling at least a portion of the internal combustion engine so as to correct the produced output based on a difference in the specifically determined fuel property. According to the control device and a control method thereof, driveability is secured even in the case where a blended fuel is used during a high load region of the internal combustion engine.

19 Claims, 11 Drawing Sheets

FOREIGN PATENT DOCUMENTS

| | | |
|---|---|---|
| JP | 4-259639 | 9/1992 |
| JP | 7 011993 | 1/1995 |
| JP | 2003 239776 | 8/2003 |
| JP | 2005-48703 | 2/2005 |
| JP | 2006 2706 | 1/2006 |

* cited by examiner

CONTROL DEVICE AND CONTROL METHOD FOR INTERNAL COMBUSTION ENGINE

CROSS-REFERENCE TO PRIORITY APPLICATIONS

The present application claims priority to Japanese Patent Application No. 2006-343815 filed on Dec. 21, 2006, the entire contents of which are hereby incorporated herein by reference.

BACKGROUND OF THE INVENTION

1. Field of the Invention

The invention relates to a control device and a control method for an internal combustion engine for controlling an internal combustion engine capable of using a blended fuel in which, for example, several kinds of fuels are blended.

2. Description of the Related Art

Generally, internal combustion engines that use various types of fuels, including internal combustion engines capable of using the aforementioned kind of blended fuel, require a suitable contrivance in order to secure driveability. For example, if the amount of fuel injection is reduced when an idle operation is being performed following the completion of cranking and the engine rotation speed is a low speed, for example, an idling rotation speed, a drop in the engine rotation speed to below the idling rotation speed occurs, and degrades the driveability (e.g., causing a lean misfire, knocking, faults due to an exhaust gas temperature rise, etc.). To cope with such faults, a technology regarding internal combustion engines that mainly use a common fuel, for example diesel or the like, has been proposed in which the maximum fuel injection amount is restricted at the time of cranking, and after the end of cranking, the injection amount is increased to or above a control amount (see Japanese Patent Application Publication No. 2006-2706 (JP-A-2006-2706)). According to this technology, a drop of the engine rotation speed following the end of cranking at the time of start of the engine is restrained. Then, the loss in driveability can be restrained.

However, the foregoing technology disclosed in Japanese Patent Application Publication No. 2006-2706 (JP-A-2006-2706) can suffer from the following problems. That is, in the technology disclosed in Japanese Patent Application Publication No. 2006-2706 (JP-A-2006-2706), consideration is given regarding the time of starting the engine, but no consideration is given regarding the time of full load occurring after the elapse of a certain amount of time following the starting of the engine. Therefore, there is a possibility of an undesired event as follows. That is, at the time of full load, a proper injection amount cannot be secured or the injection end timing may become retarded, and therefore the output produced may become lower than an assumed value or may become unstable, thus resulting in a deteriorated driveability or a deteriorated combustion. Therefore, in order to truly secure a driveability, it is necessary to suitably adjust the injection amount not only at the time of starting the engine, but also at other times. Furthermore, in a situation where besides gasoline, a blended fuel in which several kinds of fuel, such as alcohol or the like, are blended is used, which trend is recently increasing from the viewpoint of alternative energy, the securement of driveability as mentioned above is becoming increasingly difficult.

SUMMARY OF THE INVENTION

The invention has been accomplished in view of the foregoing problems, and provides a control device and a control method for an internal combustion engine capable of suitably securing driveability even in the case where a blended fuel as mentioned above is used in a high-load operation region.

Accordingly, there is provided a control device for an internal combustion engine that includes: a fuel injection device that injects a fuel in accordance with a required injection amount that is required for combustion in a combustion chamber that is performed to produce an output of the internal combustion engine; a fuel property specific determination device that specifically determines a fuel property of the fuel injected; and a control device that performs an output correction process of controlling at least a portion of the internal combustion engine so as to correct the produced output based on a difference in the specifically determined fuel property.

According to another aspect of the invention, there is provided control method for an internal combustion engine that includes:

injecting a fuel in accordance with a required injection amount that is required for combustion in a combustion chamber that is performed to produce an output of the internal combustion engine;

specifically determining a fuel property of the fuel injected; and performing an output correction process of controlling at least a portion of the internal combustion engine so as to correct the produced output based on a difference in the specifically determined fuel property.

According to the control device and the control method for the internal combustion engine as described above, even in the case where a blended fuel is used, the driveability can be suitably secured because of the following operation.

Firstly, in accordance with the required injection amount required for the combustion in the combustion chamber that is performed to produce the output of the internal combustion engine, fuel is injected into the intake pipe or the cylinder by the fuel injection device, for example, an injector. The "required injection amount" herein is an injection amount that is considered necessary, judging from the operation state of the internal combustion engine and the like. It is advisable that the required injection amount be determined regularly or irregularly by an electronic control unit (ECU), for example, on the basis of a map that is arranged beforehand in correspondence to the operation state.

Simultaneously or approximately simultaneously with this operation, and preferably, at the time of start of the engine immediately following a fuel refill, the fuel property of the fuel injected is specifically determined by the fuel property specific determination device, for example, an air-fuel ratio sensor, an alcohol concentration sensor or the like. The "fuel property" herein indicates a physical or chemical characteristic of the fuel that can affect the injection amount, and is a comprehensive concept that includes, for example, the octane number, the equivalence ratio, etc., and also includes the blend proportions of fuels if a plurality of fuels are blended.

Then, the control device performs the output correction process of controlling at least a portion of the internal combustion engine so as to correct the produced output on the basis of a difference in the fuel property that is specifically determined as described above. The "difference in the fuel property" herein may mean an absolute difference in the fuel property viewed with reference to a certain value, or may also mean a relatively difference in the fuel property in the case where the fuel property is changed by the fuel refill or the like. Therefore, typically, the fuel property specifically determined by the fuel property specific determination device is compared with a reference value or a standard value thereof, or with a previous value, by the control device. Such a "difference" is monitored regularly or irregularly. Then, the output correction process on the basis of the "difference" is performed.

The "portion of the internal combustion engine" represents a component part that is particularly related to the generation or the increase/decrease of the output, of various component parts that constitute the internal combustion engine. For example, the portion of the internal combustion engine is at least one of component parts that change the intake air amount, the injection amount of fuel, the ignition timing, etc. To "correct" the produced output means the correction of the produced output from the output produced in the case where the output correction process is not performed at all, and includes, for example, restraint or maintenance of the output. Typically, when the difference in the fuel property is zero, the output correction process is not performed at all.

If the above-described output correction process is not done, there is a possibility of degradation of the combustion or the driveability in the case where a blended fuel of, for example, gasoline and ethanol, is used as a fuel. This is because although the required injection amount also changes due to a difference in the specifically determined fuel property (e.g., a difference or change in the blend proportions of a gasoline and ethanol that are different from each other in octane number), the required injection amount exceeds a properly injectable injection amount, depending on the magnitude of the required injection amount, so that there is a possibility that the output will decline below an assumed value or become unstable. This tendency is remarkable, particularly in a high load region of relatively high load in which a large amount of fuel injection can be required.

However, according to the foregoing control device for an internal combustion engine, even in the case where a blended fuel is used as the fuel, the above-described output correction process is performed, so that the produced output is corrected on the basis of a difference in the specifically determined fuel property. For example, in the case where an injection amount exceeding the range of the injection amount that the fuel injection device can properly inject is required, an injection amount that does not exceed that range is supplied to produce the output. As a result, even during the high load region, the fuel is properly injected, so that the driveability can be suitably secured. At this time, although there is a possibility of the output reducing to some extent, large or small, the reduction can be eliminated if a countermeasure, such as provision of a device that supplements the output as described below, is taken.

In the control device and the control method for the internal combustion engine, it is also preferred to predict that there is a possibility that the produced output will decline or become unstable, if the required injection amount is in a high injection amount region above a limit injection amount of the fuel injection device.

According to the control device and the control method for the internal combustion engine, it is possible to predict an event in which the output correction process needs to be performed, in the following manner. Specifically, it is determined whether or not the required injection amount is in the high injection amount region above the limit injection amount of the fuel injection device. The "limit injection amount" herein is a value that is within a range in which the linearity of the injection amount is secured, and that can be properly injected unless the limit injection amount is exceeded. Therefore, in the case where the required injection amount is in the high injection amount region, the linearly of the injection amount is not secured, and it is predicted by the prediction device, such as an electronic control unit or the like, there is a possibility that the produced output will decline or become unstable. Since it is possible to suitably predict an event in which the output correction process needs to be performed in the above-described manner, it becomes possible to take a countermeasure with a good margin.

Furthermore, in the control device and the control method for the internal combustion engine equipped with the prediction device, it is preferred to perform the output correction process so that the output corresponding to the limit injection amount becomes an upper limit of the produced output, if it is predicted that during the high injection amount region, the output corresponding to the required injection amount will decline.

In the control device and the control method for the internal combustion engine, it is possible to secure the linearity of the injection amount in the following manner. Specifically, in the case where it is predicted that the output corresponding to the required injection amount in the high injection amount region will decline, the output correction process is performed by the control device so that the output corresponding to the limit injection amount becomes the upper limit of the produced output. Therefore, since the injection amount of the fuel does not exceed the limit injection amount, the linearity of the injection amount is suitably secured, and the output is stabilized.

It is also preferred that the control device for the internal combustion engine equipped with the prediction device further include a supplementary device that at least partially offsets a reduction in the output when the output is predicted to decline.

According to this control device for the internal combustion engine, it is possible to secure the required output as well as stabilize the output, in the following manner. Specifically, when the output is predicted to decline, the reduction in the output is at least partially offset by the supplementary device such as a fuel pressure-raising pump, or an output assist motor, or the like. To "offset" the reduction in the output is to increase the output predicted to decline, by some extent, large or small. In this manner, the output is stabilized, and the reduction in the output is lessened so that the required output can be secured. Therefore, a great advantage in practice is attained.

In the control device for the internal combustion engine that is equipped with the supplement device as described above, it is also preferred that the supplement device at least partially offset the reduction in the output by raising a fuel pressure of the fuel injected.

According to the control device for the internal combustion engine as described above, it is possible to secure the required output as well as stabilize the output. More specifically, the reduction in the output is at least partially offset by the supplement device raising the fuel pressure of the fuel injected. For example, in an in-cylinder injection type internal combustion engine, if the fuel pressure is raised by compressing the fuel prior to the injection through the use of a pump or the like, the output relatively increases. In this manner, it is possible to secure the required output as well as stabilize the output.

Furthermore, in the control device for the internal combustion engine, it is also preferred that the control device further include an adjustment device that adjusts an intake air amount that is an amount of air taken into the combustion chamber, and that the control device perform the output correction process by controlling the adjustment device so as to increase or decrease the intake air amount.

According to the control device for the internal combustion engine as described above, the output can be stabilized in the following manner. More specifically, the intake air amount that is the amount of air taken into the combustion chamber is adjusted by the adjustment device. It is to be noted herein that the intake air amount and the produced output have a passive correlation. Therefore, in order to performed the foregoing output correction process, the adjustment device is controlled by the control device so as to increase or decrease the intake air amount. For example, in the case where in the output correction process, the output corresponding to the limit injection amount becomes the upper limit of the produced output, the adjustment device is controlled so that the intake air amount is lowered in conformation with the upper limit. In this manner, the output can be stabilized.

In the control device for the internal combustion engine that is equipped with the adjustment device as described above, it is also preferred that the adjustment device adjust the intake air amount by adjusting an opening area of an intake pipe that is a passageway of the air taken in.

According to the control device for the internal combustion engine as described above, the adjustment device is typically a throttle valve, and adjusts the intake air amount by adjusting the opening area of the intake pipe that is the passageway of the air that is taken in. Using the adjustment device, the output can be stabilized as descried above.

In the control device for the internal combustion engine that is equipped with the adjustment device as described above, it is also preferred that the control device further include a supercharge device that supercharges the air taken in, and that the adjustment device adjust the intake air amount by adjusting an amount of air of the air taken in that bypasses the supercharge device.

According to the control device for the internal combustion engine as described above, the output can be stabilized in the following manner. Specifically, the air taken in is supercharged by the supercharge device such as a supercharger. It is to be noted herein that, of the air taken in, the air that passes through the supercharge device is supercharged while the air that does not pass through the supercharge is not supercharged. Therefore, of the air taken in, the amount of air that bypasses the supercharge device is adjusted by the adjustment device, such as an air bypass valve, whereby the intake air amount is adjusted. In this manner, the intake air amount is adjusted, so that the output can be stabilized as described above.

In the control device for the internal combustion engine that is equipped with the adjustment device as described above, in order to solve the aforementioned tasks, the control device further includes a supercharge device that supercharges the air taken in by using an exhaust gas associated with the combustion, and that the adjustment device adjust the intake air amount by adjusting an amount of exhaust gas of the exhaust gas that bypasses the supercharge device.

According to the control device for the internal combustion engine as described above, the output can be stabilized in the following manner. Specifically, the air taken in is supercharged by using the exhaust gas associated with the combustion, through the use of the supercharge device such as a turbo-supercharger. It is to be noted herein that the amount of exhaust gas used and the supercharge pressure have a positive correlation. Therefore, of the exhaust gas, the amount of exhaust gas that bypasses the supercharge device is adjusted by the adjustment device, such as a waste gate valve or the like, whereby the supercharge pressure and the intake air amount are adjusted. In this manner, the intake air amount is adjusted, so that the output can be stabilized as described above.

Furthermore, in the control device and the control method for the internal combustion engine, it is also preferred to perform the output correction process during a low rotation speed region below a predetermined rotation speed threshold value, if it is specifically determined in terms of the fuel property that a blend proportion of a fuel that has a high octane number above a predetermined octane number threshold value, of a plurality of fuels blended in the fuel injected, exceeds a predetermined blend proportion threshold value.

According to the control device and the control method for the internal combustion engine as describe above, the output can be stabilized in the following manner. Specifically, firstly, let it assumed that it is specifically determined in terms of the fuel property that the blend proportion of the fuel that has a high octane number above the predetermined octane number threshold value, of the plurality of fuels blended in the fuel injected, exceeds the predetermined blend proportion threshold value. In this case, the output correction process as described above is performed by the control device during the low rotation speed region below the predetermined rotation speed threshold value. Therefore, the intake air amount (i.e., a part of the energy amount) is restricted, particularly, by an amount that corresponds to the improvement in the combustion efficiency due to the low rotation speed region and the high-octane-number fuel, so that the output determined from the combustion efficiency and the energy amount can be made constant or stable. It is advisable that the "predetermined octane number threshold value" be determined beforehand as a lower limit value of the octane number that brings about an improvement in the combustion chamber that results in a practically unignorable improvement in the output from experiments, experiences, simulations, etc. It is also advisable that the "predetermined blend proportion threshold value" be determined beforehand as an upper limit value of rotation speed as a measure of the operation region in which a fuel being high in octane number contributes to improvement in the combustion efficiency from experiments, experiences, simulations, etc.

Furthermore, in the control device and the control method for the internal combustion engine, it is also preferred to perform the output correction process during a high rotation speed region above a predetermined rotation speed threshold value, if it is specifically determined in terms of the fuel property that a blend proportion of a fuel that is a low-heat-generation fuel whose heat generation amount is below a predetermined heat generation amount, of a plurality of fuels blended in the fuel injected, exceeds a predetermined blend proportion threshold value.

According to the control device and the control method for the internal combustion engine as described above, the output can be stabilized in the following manner. Specifically, let it assumed that it is specifically determined in terms of the fuel property that a blend proportion of a fuel that is a low-heat-generation fuel whose heat generation amount is below the predetermined heat generation amount, of the plurality of fuels blended in the fuel injected, exceeds the predetermined blend proportion threshold value. It is advisable that the "predetermined heat generation amount" be determined beforehand as an upper limit value of the heat generation amount that brings about an improvement in the combustion efficiency that results in a practically unignorable improvement in the output, from experiments, experiences, simulations, etc. In this case, the output correction process as described above is performed by the control device during a high rotation speed region above the predetermined rotation speed threshold value. Therefore, the intake air amount (i.e., a part of the energy amount) is restricted, particularly, by an amount that corresponds to the improvement in the combustion efficiency that is likely to be brought about during the high rotation speed region by the low-heat-generation fuel, so that the output determined from the combustion efficiency and the energy amount can be made constant or stable.

Furthermore, in the control device and the control method for the internal combustion engine, it is also preferred to perform the output correction process so that a relative low output of the outputs that are assumed regarding each of the plurality of fuels blended in the fuel injected is produced. It is also preferred to perform the output correction process so that a lowest output of the outputs that are assumed regarding each of the plurality of fuels blended in the fuel injected is produced.

According to the control device and the control method for the internal combustion engine, even in the case where the fuel property is not specifically determined, and is therefore uncertain, the output can be stabilized in the following manner. Specifically, the output correction process is performed by the control device so as to produce a relatively low output of the outputs assumed regarding each of the plurality of fuels blended in the fuel injected. Furthermore, the output correction process is performed so as to produce the lowest output of the outputs assumed regarding each of the plurality of fuels blended in the fuel injected. It is advisable that the "outputs assumed" be determined beforehand as outputs that are assumed regarding each of the plurality of fuels during predetermined operation regions from experiments, experiences, simulations, etc. For example, let it assumed that the fuel injected contains a fuel 1 and a fuel 2 blended. During a certain rotation speed region, in the case where the assumed output of the fuel 2 is lower than the assumed output of the fuel 1, the output correction process is performed so as to produce the assumed output of the fuel 2 even if the blend proportion of the fuel 2 is less than that of the fuel 1. Conversely, during the high rotation speed region, in the case where the assumed output of the fuel 1 is lower than that of the fuel 2, the output correction process is performed so as to produce the assumed output of the fuel 1. Thus, since the output is produced in conformation with a relatively low output or the lowest output of the assumed outputs, the stabilization of the output can be preferentially secured even in the case where the fuel property is uncertain, such as the case where the blend proportions are unclear.

Furthermore, in the control device and the control method for the internal combustion engine, it is also preferred to specifically determine the fuel property based on an air-fuel ratio of an exhaust gas associated with the combustion.

According to the control device and the control method for the internal combustion engine, the fuel property is suitably specifically determined, so that the output can be stabilized, as described below. Specifically, for example, the fuel property is specifically determined on the basis of the air-fuel ratio of exhaust gas associated with the combustion by a fuel property specific determination device, for example, an air-fuel ratio sensor, and an electronic control unit to which the actually measured value from the air-fuel sensor is input. For example, from the deviation of the air-fuel ratio learned value calculated on the basis of the air-fuel ratio of exhaust gas associated with combustion, the alcohol concentration in the fuel injected is specifically determined. Using the fuel property specifically determined in this manner, the output can be stabilized.

Furthermore, in the control device for the internal combustion engine, it is also preferred to specifically determine the fuel property based on an output value of a fuel property sensor provided for a fuel tank that stores the fuel.

According to the control device for the internal combustion engine as described above, the fuel property is suitably specifically determined, and the output can be stabilized. Specifically, the fuel property, for example, the alcohol concentration, the blend proportion, etc., is specifically determined directly or indirectly by the fuel property specific determination device, such as the fuel property sensor provided for the fuel tank that stores fuel. Using the fuel property specifically determined in this manner, the output can be stabilized.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in more detail with reference to exemplary embodiments.

(1) A construction and an operation process of a control device for an internal combustion engine in accordance with first embodiment will be described with reference to FIGS. 1 to 7. According to this embodiment, the driveability can be suitably secured even in the case where a blended fuel is used, as described in detail below. In particular, since the amount of intake air is appropriately restricted in accordance with the fuel property (in this case, the alcohol concentration), an event of the fuel injection amount becoming insufficient relative to the intake air amount is avoided. In consequence, it becomes possible to avoid a lean misfire, knocking, or a rise in the exhaust gas temperature, and also avoid a damage to the engine, etc.

(1-1) Construction

Figure 1:
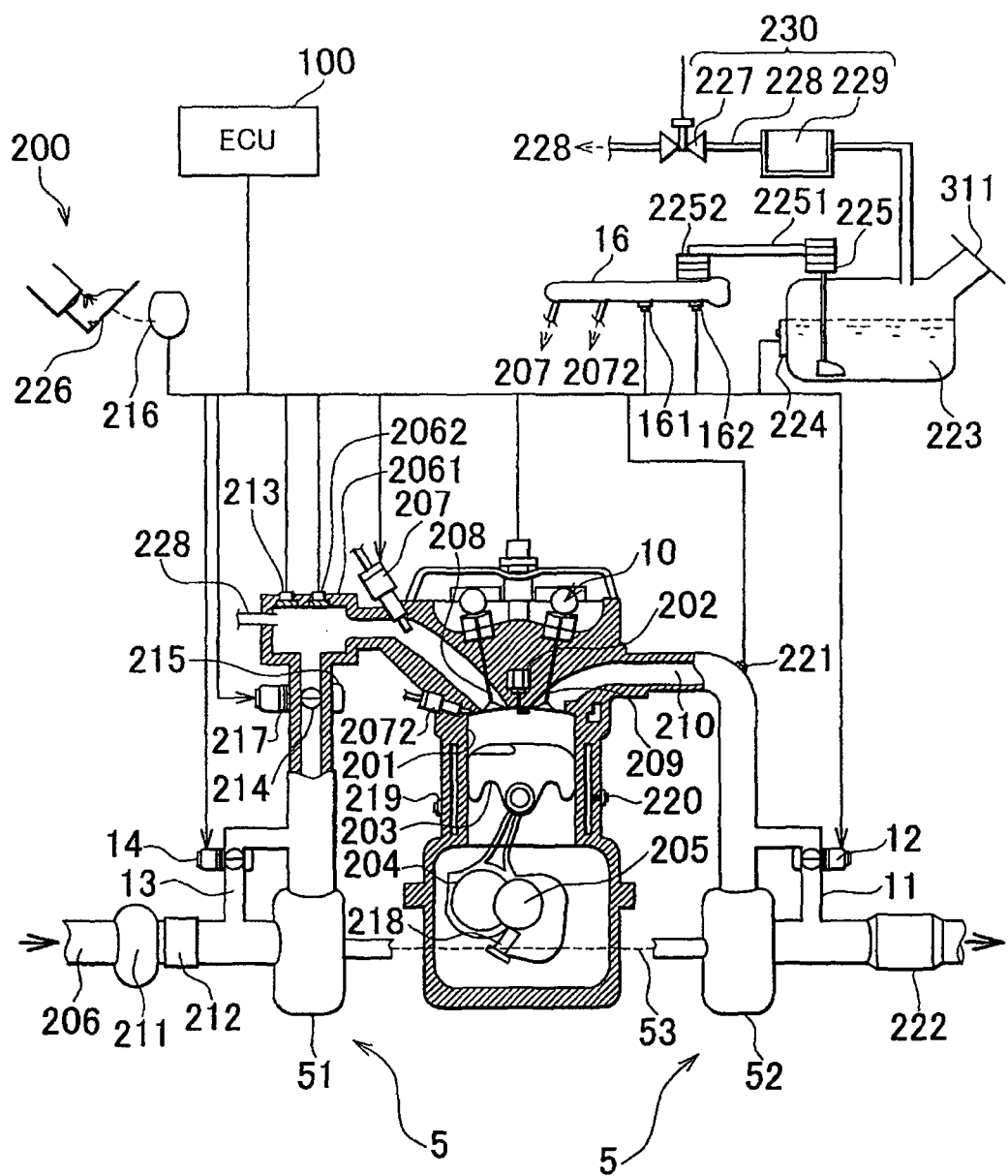
FIG. 1 is a schematic sectional view of an engine equipped with a control device for an internal combustion engine in accordance with various embodiments of the invention.

Firstly, a basic construction of a control device for an internal combustion engine in accordance with the embodiment will be described with reference to FIG. 1. FIG. 1 is a schematic sectional view of an engine equipped with a control device for an internal combustion engine in accordance with the embodiment of the invention.

In FIG. 1, an engine 200, an example of the internal combustion engine in accordance with the invention, is equipped with a cylinder 201, a fuel tank 223, a fuel injection valve 207, a direct-injection-type fuel injection valve 2072, a purge device 230, an intake system that includes an intake pipe 206 and the like, an exhaust system that includes an exhaust pipe 210 and the like, a turbo-supercharger 5, a control device 100, etc. Concretely, each of these components and the like is constructed as follows.

In the cylinder 201, the mixture is ignited by an ignition plug 202 so that the mixture combusts. The reciprocating motion of a piston 203 corresponding to the explosive power from the combustion is converted into the rotary motion of a crankshaft 205 via a connecting rod 204. Due to this rotary motion, the vehicle provided with the engine 200 is driven. Around the cylinders 201, there are disposed various sensors, including a water temperature sensor 220 that detects the temperature of cooling water, a crank position sensor 218 capable of detecting the rotation speed of the engine 200 by detecting the crank angle, a knock sensor 219 that detects the presence/absence of a knock or the degree thereof, etc. The output of each sensor is supplied as a corresponding detection signal to the control device 100.

The fuel tank 223 stores fuel that is fed through a fuel filler opening 311. The fuel fed herein may be a blended fuel obtained by blending, for example, gasoline with an alcohol-based fuel, such as ethanol or the like. A fuel sensor 224 detects the amount of fuel stored. The stored fuel is drawn up as appropriate by a pump 225, and is pressurized to a target injection pressure by a high-pressure pump 2252 connected via a low-pressure supply passageway 2251, and then is supplied to a fuel distribution pipe 16 that is connected to the fuel injection valve 207 and the direct-injection-type fuel injection valve 2072. That is, the high-pressure pump 2252 is an example of the "supplementary device" in accordance with the invention. The fuel distribution pipe 16 is provided with an alcohol sensor 161 and a fuel pressure sensor 162. The alcohol sensor 161 detects the alcohol concentration in the gasoline-alcohol blended fuel on the basis of a change in the dielectric constant, etc. The fuel pressure sensor 162 detects the fuel pressure in the fuel distribution pipe 16.

The fuel injection valve 207 is an example of the "fuel injection device" in accordance with the invention, and injects the fuel supplied from the fuel tank 223 into the intake pipe 206 in accordance with the control by the control device 100. The direct-injection-type fuel injection valve 2072 is an example of the "fuel injection device" in accordance with the invention, and injects fuel directly into each cylinder. Then, the uniform combustion in which a uniform mixture is formed by forming a layer of a combustible blend proportion near the ignition plug 202 (stratified combustion) is carried out. The air-fuel ratio in this uniform combustion is, normally, lean of the stoichiometric air fuel ratio, thus reducing the fuel consumption. More specifically, during a low-load engine operation or the like during which the required injection amount is small and therefore it is desired that a desired amount of fuel be reliably supplied into the cylinder 201, fuel is injected via the direct-injection-type fuel injection valve 2072 capable of accurately supplying a desired amount of fuel into the cylinder. During an intermediate-load engine operation during which the required injection amount is relatively large and therefore the discharged amount of unburned fuel tends to increase, fuel is injected via the fuel injection Valve 207, which is advantageous in forming a uniform mixture that is well uniformed. As the engine load becomes higher and a high-load engine operation region is reached, the lean combustion cannot produce sufficient engine output, and therefore the uniform combustion at the stoichiometric air fuel ratio is carried out. Incidentally, although the injection of fuel can be performed if at least one of the fuel injection valve 207 and the direct-injection-type fuel injection valve 2072 is provided, it is preferable from a practical standpoint that the direct-injection-type fuel injection valve 2072 be provided if the fuel pressure needs to be raised.

The purge device 230 is provided with a canister 229, a purge passageway 228, and a purge control valve 227. The canister 229 has therein an adsorbent made of activated carbon, and adsorbs fuel vapor (i.e., purge gas) occurring in the fuel tank 223. The purge passageway 228 links the fuel tank 223, the canister 229 and the intake pipe 206 in communication. The purge control valve 227 is provided on the purge passageway 228 downstream of the canister 229, and is opened and closed under the control of the control device 100. Due to the opening/closing of the purge control valve 227, the purge gas stored by the adsorbent in the canister 229 is appropriately introduced into the intake pipe 206.

The intake pipe 206 links the cylinder 201 and the external air in communication, and is constructed so as to be capable of taking external air (air) into the cylinder 201. The channel of the intake pipe 206 is provided with an air clearer 211 that cleans the intake air, an air flow meter 212 that detects the mass flow of intake air (i.e., intake air amount), a throttle valve 214 that is an example of the "adjustment device" in accordance with the invention and that adjusts the amount of intake air taken into the cylinders 201, a throttle position sensor 215 that detects the degree of opening of the throttle valve 214, an accelerator position sensor 216 that detects the accelerator operation amount, that is, the amount of depression of an accelerator pedal 226 caused by a driver, a throttle valve motor 217 that drives the throttle valve 214 on the basis of the amount of depression, an intake air temperature sensor 213 that detects the temperature of intake air, a surge tank 2061 that stores intake air and distributes air to each of a plurality of cylinders, a pressure sensor 2062 that detects the intake pipe pressure in the surge tank 2061, and a compressor 51 that is a part of a turbo-supercharger 5 described below.

The exhaust pipe 210 links the cylinder 201 and the external air in communication, and is constructed so that the mixture burned within the cylinder 201 can be discharged as exhaust gas. The channel of the exhaust pipe 210 is provided with an air-fuel ratio sensor 221, a catalyst 222, and a turbine 52 that is a part of the turbo-supercharger 5, etc. The air-fuel ratio sensor 221 is an example of the "fuel property specific determination device" in accordance with the invention, and is constructed of, for example, a zirconia solid electrolyte or the like, and detects the air-fuel ratio (A/F) in exhaust gas in the exhaust pipe 210, and supplies a detection signal to the control device 100. On the basis of the detection signal, the air-fuel ratio feedback correction is performed to indirectly specifically determine the alcohol concentration in the fuel. The catalyst 222 is, for example, a three-way catalyst having a noble metal such as a platinum, rhodium, etc., as an active component, and is provided, for example, on a channel of the exhaust pipe 210. The catalyst 222 has a function of removing nitrogen oxides (NOx), carbon monoxide (CO), hydrocarbon (HC), etc., from exhaust gas.

An intake valve 208 is constructed to be able to control the state of communication between the interior of the cylinder 201 and the intake pipe 206. An exhaust valve 209 is constructed to be able to control the state of communication between the interior of the cylinder 201 and an exhaust pipe 210. The opening/closing timing of these valves is adjusted by a variable valve device 10 that is constructed of, for example, a well-known variable valve timing mechanism (variable valve timing-intelligent system (VVT-i)). The variable valve device 10 is constructed to be able to change the valve characteristics of the intake valves 208 and the exhaust valves 209 of the cylinders. It suffices that the variable valve device be able to control the opening/closing timing of the intake valve and the exhaust valve. For example, a cam-by-wire device, an electromagnetically driven valve, etc., may be used as the variable valve device 10.

The turbo-supercharger 5 is an example of the "supercharge device" in accordance with the invention, and is provided with a turbine 52 provided on a channel of the exhaust pipe 210, a compressor 51 provided on a channel of the intake pipe 206, and a power transmission portion 53 that mechanically couples the turbine 52 and the compressor 51. The turbine 52 receives exhaust gas and is thereby rotated. The rotation thereof is transmitted to the compressor 51 via the power transmission portion 53, so that the compressor 51 supercharges intake air with a predetermined supercharge pressure. This supercharge achieves the supply of a large amount of intake air into the cylinder 201, and makes it possible to expand the lean-combustion range to a high-load side. However, if the supercharge pressure exceeds a design limit, various portions may suffer from faults. Therefore, in order to provide a margin of the supercharge pressure to the design limit, the turbo-supercharger 5 is further provided with a waste gate valve 12 and an air bypass valve 14. The waste gate valve 12 is an example of the "adjustment device" in accordance with the invention, and adjusts the area of the opening of the waste gate passageway 11 for a bypass of the exhaust pipe 210 around the turbine 52. The air bypass valve 14 is an example of the "adjustment device" in accordance with the invention, and adjusts the area of the opening of the air bypass passageway 13 for a bypass of the intake pipe 206 around the compressor 51. This adjustment restrains the excessive rotation of the turbo-supercharger 5, and appropriately restrains the supercharge pressure.

The control device 100 is an example of the "fuel property specific determination device", the "control device" and the "prediction device". The control device 100 is an electronic control unit (ECU) composed as a logic operation circuit whose main components are a central processing unit (CPU), a read-only memory (ROM) in which control programs are stored beforehand, a random read/write memory (random access memory (RAM)) for storing various data, etc. The control device 100 is connected via a bus to an input port that receives input signals from various sensors, including the air-fuel ratio sensor 221, the crank position sensor 218, etc., and also to an output port from which control signals are sent to various actuators of the variable valve device 10, the fuel injection valve 207, the direct-injection-type fuel injection valve 2072, the waste gate valve 12, the air bypass valve 14, etc.

Figure 2:
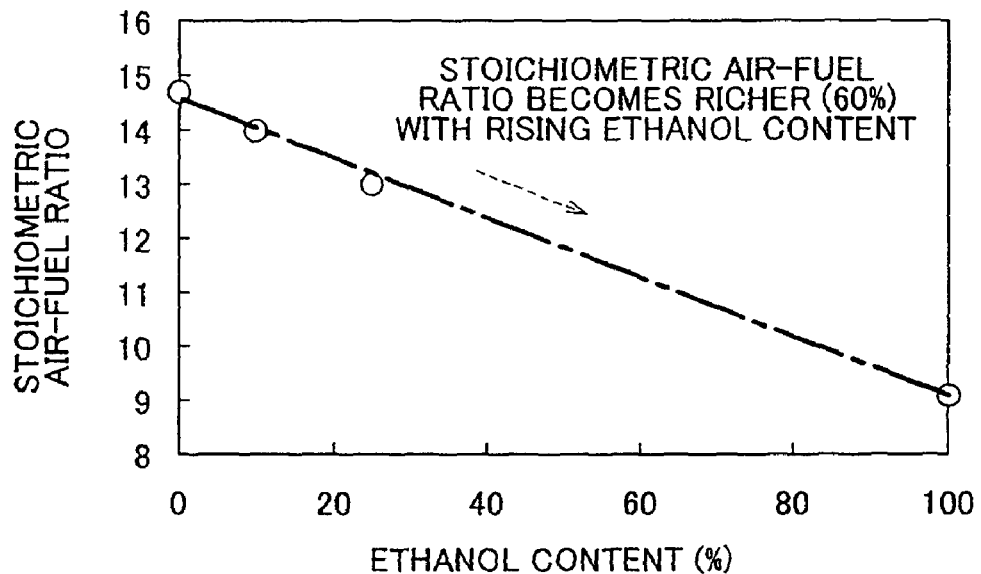
FIG. 2 is a characteristic diagram showing a relationship between the ethanol content and the stoichiometric air fuel ratio.
Figure 3:
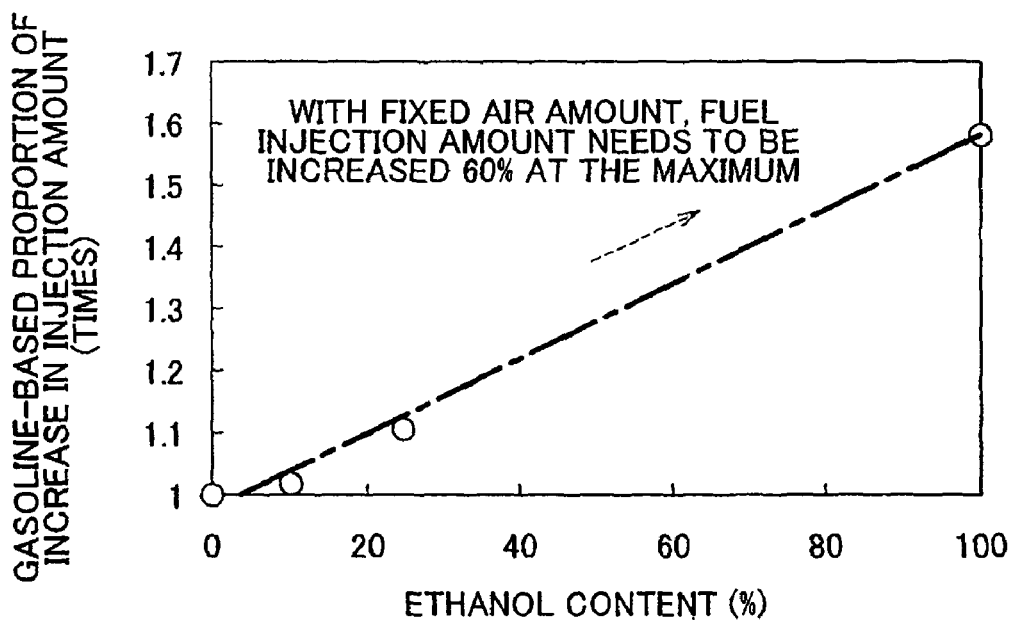
FIG. 3 is a characteristic diagram showing a relationship between the ethanol content and the gasoline-based proportion of the increase in the injection amount.
Figure 4:
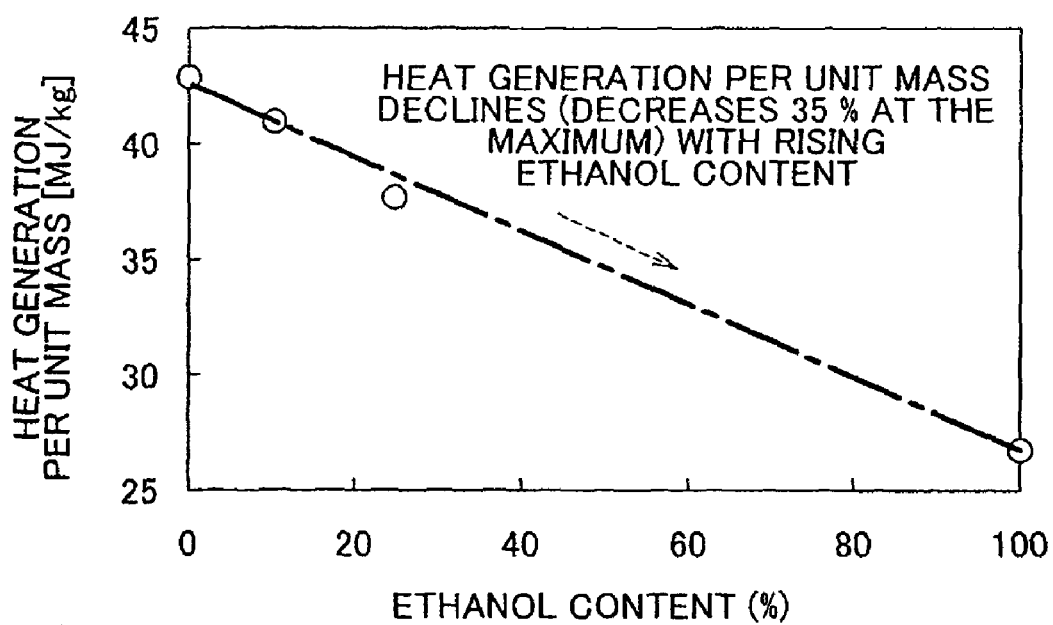
FIG. 4 is a characteristic diagram showing a relationship between the ethanol content and the amount of heat generation per unit mass.

Now, with reference to FIGS. 2 to 4, changes in the various fuel characteristics in association with changes in the fuel property (e.g., the ethanol content) will be described in detail. FIG. 2 is a characteristic diagram showing a relationship between the ethanol content and the stoichiometric air fuel ratio. FIG. 3 is a characteristic diagram showing a relationship between the ethanol content and the gasoline-based proportion of the increase in the injection amount. FIG. 4 is a characteristic diagram showing a relationship between the ethanol content and the amount of heat generation per unit mass.

In FIG. 2, the horizontal axis shows the ethanol content (%) in the blended fuel, and the vertical axis shows the stoichiometric air fuel ratio (i.e., the target value of air-fuel ratio) that corresponds to the ethanol content. For example, the stoichiometric air fuel ratio in the case of the ethanol content being 0% is 14.7, and the stoichiometric air fuel ratio in the case of the ethanol content being 100% is 9. This shows that if the ethanol content is increased from 0% to 100%, the stoichiometric air fuel ratio becomes richer by 60% at the maximum.

In FIG. 3, the horizontal axis shows the ethanol content (%) in a blended fuel, and the vertical axis shows the gasoline-based proportion of the increase in the injection amount (number of times) that corresponds to the ethanol content. It is to be noted herein that the "gasoline-based proportion of the increase in the injection amount" shows how many times as large as the injection amount of the fuel made up of gasoline alone (that is, whose ethanol content is 0%) that is defined as a reference value the injection amount of a fuel with respect to a certain amount of air is. For example, the gasoline-based proportion of the increase in the injection amount in the case where the ethanol content is 0% is 1 (time), and the gasoline-based proportion of the increase in the injection amount in the case where the ethanol content is 100% is 1.6 (times). That is, the diagram of FIG. 3 shows that if the ethanol content is increased from 0% to 100%, the injection amount of fuel needs to be increased by 60% at a maximum.

As shown in FIGS. 2 and 3, if a blended fuel of ethanol (i.e., an example of the alcohol) and gasoline is fed through the fuel filler opening 311, the amount of oxygen in the blended fuel increases with the increasing ethanol content, so that the stoichiometric air fuel ratio changes to the rich side. Therefore, the fuel injection amount with respect to a fixed amount of air must be made larger than in the case where only gasoline is used. That is, as shown in FIG. 3, the gasoline-based proportion of the increase in the injection amount relatively increases.

In FIG. 4, the horizontal axis shows the ethanol content (%) in the blended fuel, and the vertical axis shows the amount of heat generation per unit mass that corresponds to the ethanol content.

As shown in FIG. 4, as the ethanol content rises, the amount of heat generation per unit mass of the fuel declines. For example, the amount of heat generation per unit mass in the case of the ethanol content being 0% is about 44 [MJ/kg], and the amount of heat generation per unit mass of the ethanol content being 100% is about 27 [MJ/kg]. That is, it is shown that if the ethanol content is increased from 0% to 100%, the amount of heat generation per unit mass can decline as much as 35% at the maximum.

According to the requirements shown in FIGS. 2 to 4, for example, if a blended fuel of gasoline and ethanol is used in a direct-injection gasoline engine, it is necessary to increase the injection amount (rate) of fuel in order to maintain a full load output comparable to that in the case where gasoline alone is used. However, indiscriminate increases of the injection amount (rate) should be avoided in order to secure linearity when the injection amount is small. Therefore, if the achievement of a required output during a full-load operation is attempted, the injection amount is likely to be insufficient relative to the amount of intake air, thus leading to a possibility of occurrence of a lean misfire, knocking, a rise in the exhaust gas temperature, and an engine damage.

However, according to the embodiment, a restriction is provided on the intake air amount as appropriate on the basis of the fuel property, such as the alcohol concentration in fuel, as described below, in the construction shown in FIG. 1; therefore, even in the case where a blended fuel is used, an event of the amount of fuel injection becoming insufficient relative to the intake air amount is avoided, so that the driveability can be suitably secured.

(1-2) Operation

Figure 5:
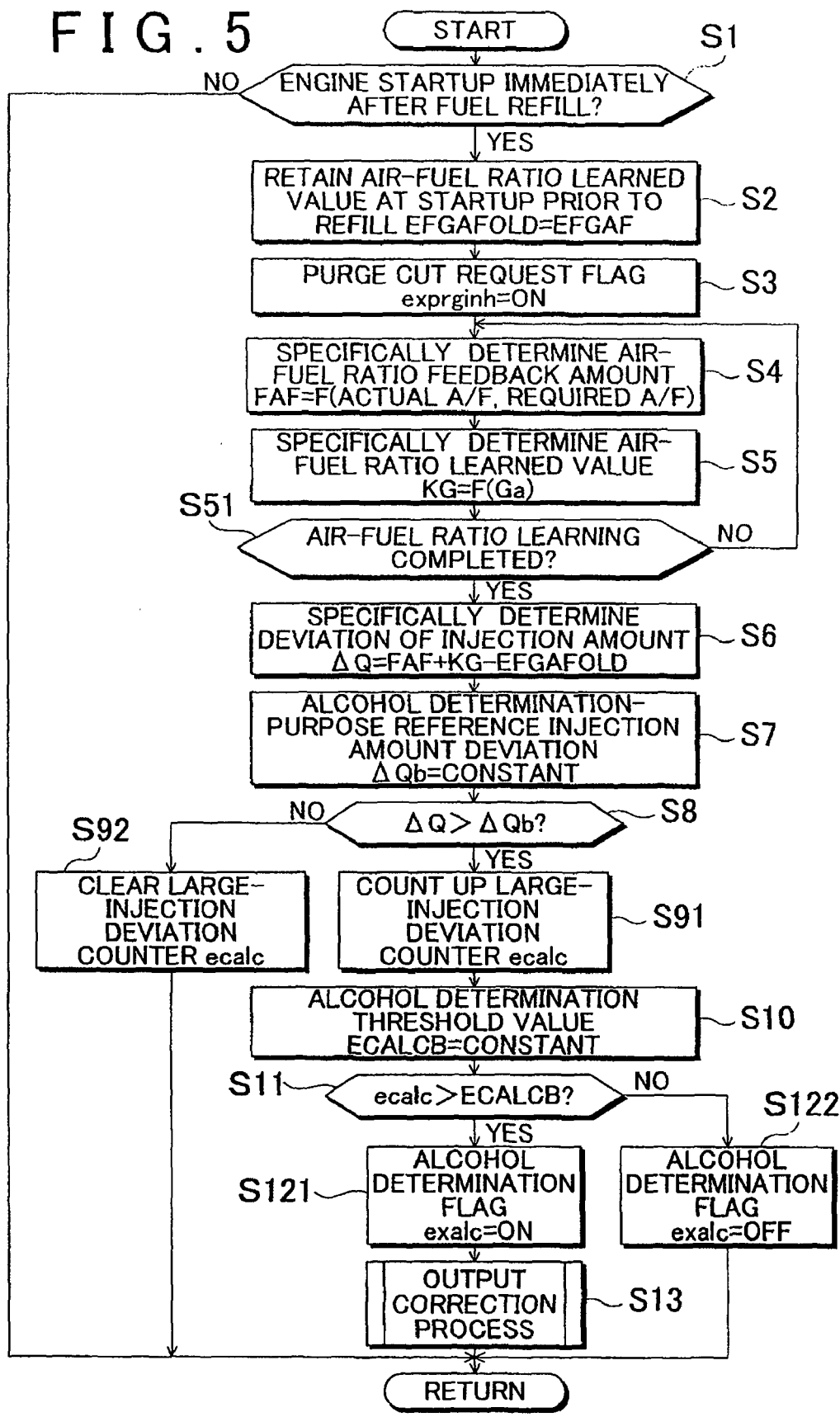
FIG. 5 is a flowchart showing a basic operation process of a control device for an internal combustion engine in accordance with a first embodiment.
Figure 6:
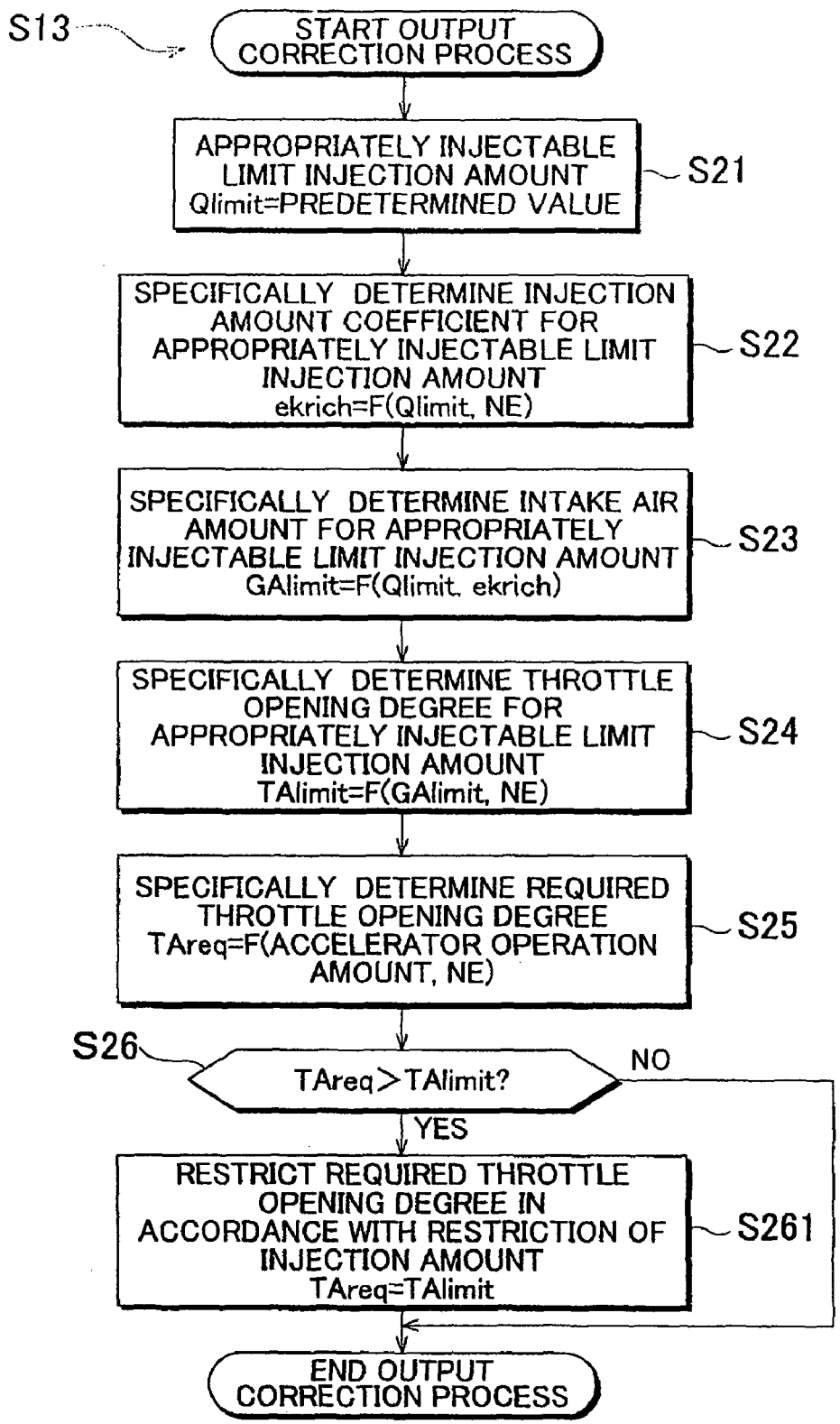
FIG. 6 is a flowchart showing an output correction process in accordance with the embodiment.
Figure 7:
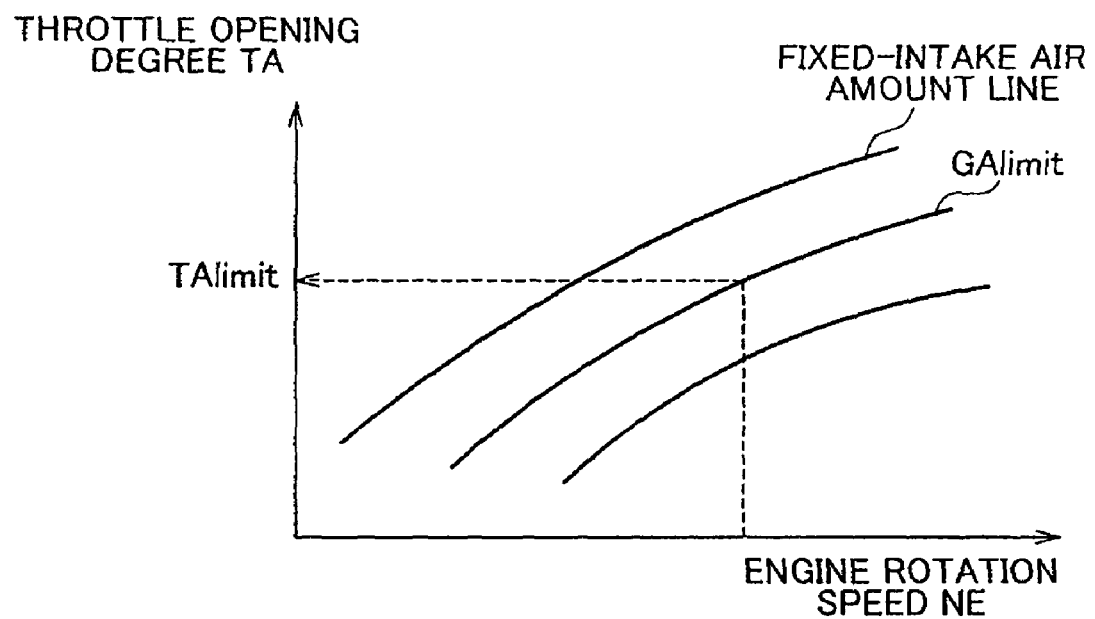
FIG. 7 is a characteristic diagram showing a relationship between the throttle opening degree, the engine rotation speed and the intake air amount.

Subsequently, operation processes of the control device for the internal combustion engine in accordance with the embodiment constructed as described above will be described with reference to FIGS. 5 to 7 as well as FIGS. 1 to 4. FIG. 5 is a flowchart showing a basic operation process of the control device for the internal combustion engine in accordance with first embodiment. FIG. 6 is a flowchart showing an output correction process in accordance with the first embodiment. FIG. 7 is a characteristic diagram showing a relationship between the throttle opening degree, the engine rotation speed and the intake air amount.

Referring to FIG. 5, firstly it is regularly or irregularly determined by control device 100 whether or not the start of the engine is a one that immediately follows a fuel refill (step S1). Whether the start of the engine is a one immediately following a fuel refill can be determined, for example, from a time-course history of fluctuation of the fuel amount detected by the fuel sensor 224.

If it is determined that the present start of the engine is a one that immediately follows a fuel refill (YES in step S1), an air-fuel ratio learned value EFGAF obtained through an air-fuel ratio learning process at the time of the engine start prior to the fuel refill is retained as a variable EFGAFOLD stored in a memory of the control device 100 (step S2).

Subsequently, a purge cut request flag exprginh is switched to an on-state (step S3). Therefore, the purge control valve 227 is closed so that the purge gas is not introduced into the intake pipe 206. Since the purge gas contains a fuel different from the fuel to be injected from the fuel injection valve 207 or the direct-injection-type fuel injection valve 2072, the purge gas may become an external disturbance in the learning of the air-fuel ratio.

Subsequently, in an air-fuel ratio feedback process for compensating for a temporary deviation of the actual air-fuel ratio from the stoichiometric air fuel ratio, an air-fuel ratio feedback amount FAF is specifically determined as FAF=F (actual A/F, required A/F) (step S4). It is to be noted herein that F(actual A/F, required A/F) shows that F(actual A/F, required A/F) has a certain functional relationship with the actual A/F and the required A/F. It is to be noted herein that the functional relationship represents a value determined depending on a given actual A/F and a given required A/F or the correspondence therebetween. Concretely, the value of FAF is determined by calculation or the use of a map. The actual A/F represents the actual air-fuel ratio detected by the air-fuel ratio sensor 221. The required A/F represents the air-fuel ratio required in order to bring the air-fuel ratio equal to the stoichiometric air fuel ratio.

Subsequently, in the air-fuel ratio learning process for compensating for a steady deviation of the actual air-fuel ratio with respect to the stoichiometric air fuel ratio, an air-fuel ratio learned value KG at the time of the present fuel refill is specifically determined as KG=F(Ga) (step S5). In this expression, Ga represents the intake air amount detected by the air flow meter 212. The specific determination of the air-fuel ratio learned value KG is meant to learn how the fuel injection amount required in order to bring the air-fuel ratio equal to the stoichiometric air fuel ratio should be changed in accordance with the detected intake air amount Ga. The concrete procedure of the learning may be the same as that in a well-known air-fuel ratio learning process, and detailed description thereof will be omitted.

Subsequently, it is determined whether or not the air-fuel ratio learning process has been completed, on the basis of the state of convergence of the air-fuel ratio feedback amount FAF (step S51). At this moment, if it is determined that the air-fuel ratio learning process has not been completed (NO in step S51) since the air-fuel ratio feedback amount FAF has not converged into a predetermined range, the air-fuel ratio learning process is performed again to specifically determine the air-fuel ratio feedback amount FAF (step S4).

On the other hand, if it is determined that the air-fuel ratio learning process has been completed (YES in step S51), the then air-fuel ratio learned value is adopted as the air-fuel ratio learned value at the time of the present fuel refill. Then, a deviation ΔQ of the injection amount of the fuel obtained from the difference between the air-fuel ratio learned values obtained at the time of the previous fuel refill and the time of the present fuel refill with the specifically-determined air-fuel ratio feedback amount FAF being factored in is specifically determined as ΔQ=FAF+KG−EFGAFOLD by the control device 100 (step S6).

Subsequently, a reference injection amount deviation ΔQb for performing the alcohol determination described below is determined as a constant (step S7). More specifically, it is advisable that the reference injection amount deviation ΔQb be determined beforehand from experiences, experiments, simulations, etc. as a lower limit value of the deviation of the injection amount that allows an estimation that the alcohol concentration in fuel has become higher than prior to the fuel refill since the deviation ΔQ of the injection amount has become higher than prior to the fuel refill.

Subsequently, it is determined by the control device 100 whether or not the deviation ΔQ of the injection amount is larger than the reference injection amount deviation ΔQb, that is, whether or not ΔQ>ΔQb (step S8).

If it is determined that ΔQ>ΔQb (YES in step S8), it can be estimated that the possibility of an abnormality of some kind being present is relatively high since the deviation ΔQ of the injection amount is relatively large. As a marker of the estimation, a high injection deviation counter ecalc is counted up (step S91).

Subsequently, the alcohol determination threshold value ECALCB is determined as a constant (step S11). More specifically, it is advisable that the alcohol determination threshold value ECALCB be determined beforehand in order to eliminate temporary errors. More specifically, it is advisable that the alcohol determination threshold value ECALCB be determined beforehand through experiences, experiments, simulations, etc. as a high injection-deviation counter value that corresponds to a lower limit value of a period that allows an estimation that since the state in which the deviation ΔQ of the injection amount is larger than the reference injection amount deviation ΔQb has continued for a while, the large deviation is present not because there exists some error but because the alcohol concentration in the fuel has been higher than prior to the fuel refill.

Subsequently, on the basis of the thus-determined alcohol determination threshold value ECALCB, the alcohol determination is performed as follows. Specifically, it is determined by the control device 100 whether or not the high injection-deviation counter ecalc is larger than the alcohol determination threshold value ECALCB, that is, whether or not ecalc>ECALCB (step S11).

If it is determined that the inequality ecalc>ECALCB does not hold (NO in step S11), it means that the state in which the deviation ΔQ of the injection amount is larger than the reference injection amount deviation ΔQb has not yet continued for the aforementioned period. That is, it cannot be clearly said that a reason why the deviation ΔQ of the injection amount is larger than the reference injection amount deviation ΔQb is relatively high alcohol concentration in fuel. As a marker of that, the alcohol determination flag exalc is switched to an off-state (step S122), and the process is performed again. Besides, if it is determined that the present start is not a one that immediately follows a refill of fuel (NO in step S1), or if it is not determined that ΔQ>ΔQb (NO in step S8) so that the high injection-deviation counter ecalc is cleared (step S92), this process is performed again.

On the other hand, if it is determined that ecalc>ECALCB (YES in step S11), it means that because the alcohol concentration in fuel is relatively high as mentioned above, the state in which the deviation ΔQ of the injection amount is larger than the reference injection amount deviation ΔQb is continuing. Therefore, as a marker of that, the alcohol determination flag exalc is switched to the on-state (step S121). It is to be noted herein that the on-state of the alcohol determination flag exalc shows that there exists a state in which the alcohol concentration in the fuel is greater than a predetermined concentration threshold value. The predetermined concentration threshold value is, for example, 50%. Typically, the alcohol concentration in the fuel exceeding the predetermined concentration threshold value shows a state in which the injection amount deviates to such an extent that the deviation cannot be effectively corrected by the air-fuel ratio feedback process. Thus, if the alcohol concentration in fuel is relatively high, there is a possibility of the injection amount becoming insufficient for the intake air amount.

Therefore, an output correction process that is an example of the "output correction process" in accordance with the invention as described in detail with reference to FIGS. 6 and 7 is performed (step S13). According to the output correction process, in the case where it is determined that the alcohol concentration is relatively high, a limit injection amount Qlimit that is the maximum amount in the range of fuel injection amount that can be properly injected while a linearity of the injection amount is secured is specifically determined, and an intake air amount GAlimit that corresponds thereto is found. Since the degree of throttle opening that is the degree of opening of the throttle valve 214 is restricted so that the intake air amount GAlimit is not exceeded, the event of the injection amount being insufficient for the intake air amount is avoided.

Concretely, in FIG. 6, firstly, a limit injection amount Qlimit that can be properly injected without impairing the linearity is determined as a predetermined value (step S21). Incidentally, it is advisable that the predetermined value be determined beforehand from experiences, experiments, simulations, etc. as the maximum value of injection amount that the fuel injection valve 207 or the direct-injection-type fuel injection valve 2072 can properly inject without impairing the linearity, or as a value obtained by subtracting a small amount of margin from the maximum value.

Subsequently, a coefficient of the injection amount corresponding to the aforementioned limit injection amount Qlimit is specifically determined as ekrich=F(Qlimit, NE) (step S22). In this expression, the injection amount coefficient ekrich is a coefficient for making the air-fuel ratio rich in fuel from viewpoint of increasing the output or protecting the catalyst, and NE is the actual engine rotation speed detected by the crank position sensor 218.

Subsequently, the aforementioned intake air amount for the limit injection amount Qlimit is specifically determined as GAlimit=F(Qlimit, ekrich) (step S23). This intake air amount GAlimit, simply put, is determined from the limit injection amount Qlimit and the target air-fuel ratio. However, in order to make the air-fuel ratio rich in fuel, the injection amount coefficient ekrich corresponding to the limit injection amount Qlimit is factored in, so that the intake air amount is relatively reduced.

Subsequently, the degree of throttle opening corresponding to the aforementioned limit injection amount Qlimit is specifically determined as TAlimit=F(GAlimit, NE) (step S24). This throttle opening degree TAlimit is specifically determined, for example, in accordance with a map as shown in FIG. 7. More specifically, in FIG. 7, the horizontal axis shows the engine rotation speed NE, and the vertical axis shows the throttle opening degree TA, and a several fixed-intake air amount lines are drawn. From the several fixed-intake air amount lines, a line corresponding to GAlimit is selected. The throttle opening degree TA that corresponds to the present engine rotation speed NE on the fixed-intake air amount line gives a desired throttle opening degree TAlimit.

Referring back to FIG. 6, subsequently the required throttle opening degree is specifically determined as TAreq=F(accelerator operation amount, NE) (step S25). The accelerator operation amount herein is the actual amount of accelerator operation detected by the accelerator position sensor 216.

Then, it is determined by the control device 100 whether or not the required throttle opening degree TAreq specifically determined as described above is larger than the throttle opening degree TAlimit corresponding to the limit injection amount Qlimit, that is, whether or not TAreq>TAlimit (step S26).

If it is determined that the inequality TAreq>TAlimit does not hold (NO in step S26), it is inferred that the injection amount that corresponds to the intake air amount for the required throttle opening degree TAreq is still within the properly injectable range, and therefore the throttle opening degree is not particularly restricted. In other words, the throttle opening degree is adjusted exactly to the required throttle opening degree TAreq.

On the other hand, if it is determined that TAreq>TAlimit (YES in step S26), it is inferred that the injection amount that corresponds to the intake air amount for the required throttle opening degree TAreq will exceed the properly injectable range. Therefore, the required throttle opening degree is restricted as in TAreq=TAlimit (step S261). That is, no matter how large the required throttle opening degree is, the throttle opening degree is not adjusted to as to be greater than the TAlimit.

As described above, according to the first embodiment, the driveability can be suitably secured even in the case where a blended fuel is used. In particular, since a restriction is provided as appropriate on the intake air amount in accordance with the alcohol concentration in fuel, the event of the amount of fuel injection becoming insufficient for the intake air amount is avoided. As a result, it becomes possible to avoid a lean misfire, knocking, or a rise in the exhaust gas temperature, and also avoid a damage to the engine, etc.

(2) Second Embodiment

Figure 8:
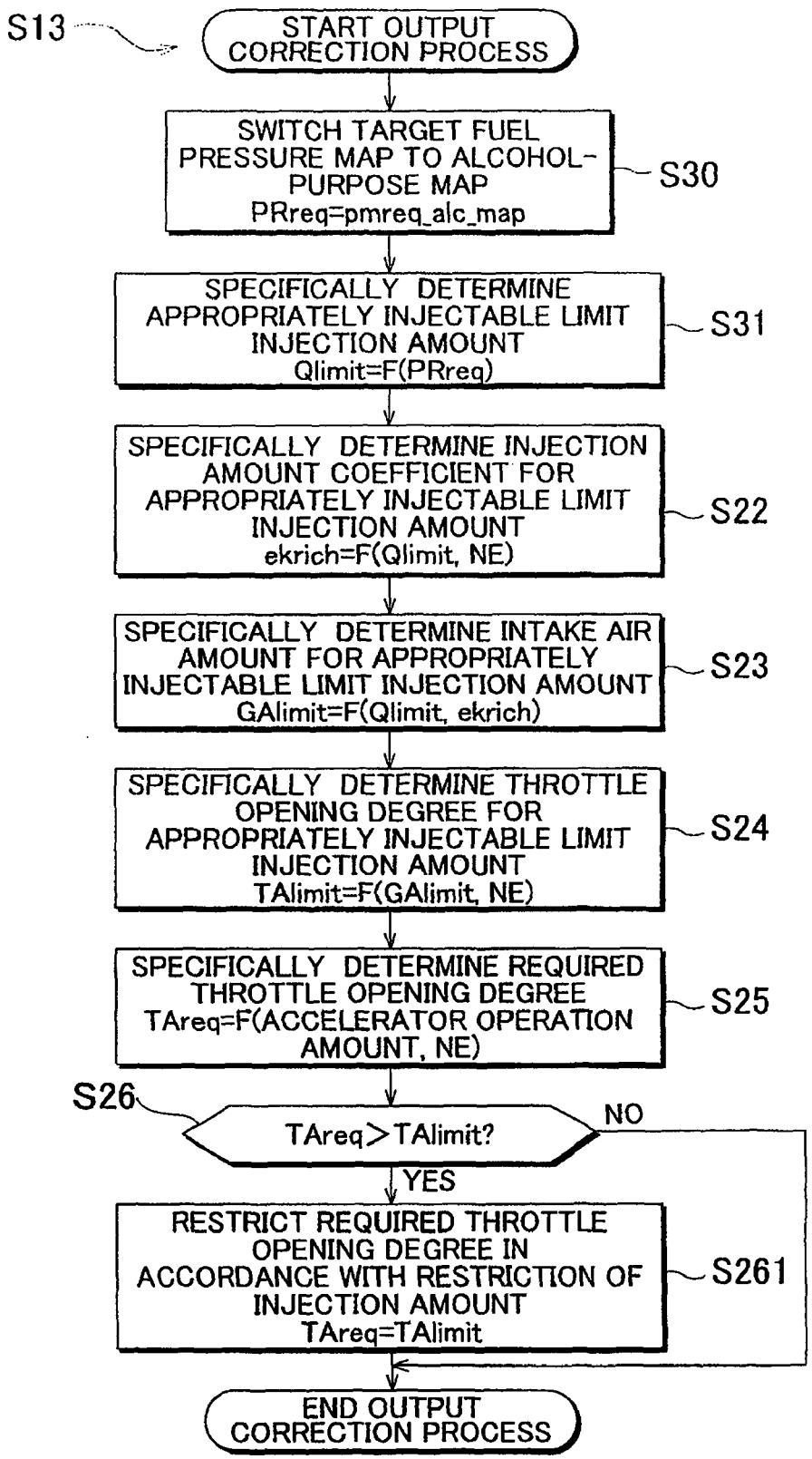
FIG. 8 is a flowchart showing an output correction process in accordance with a second embodiment.
Figure 9:
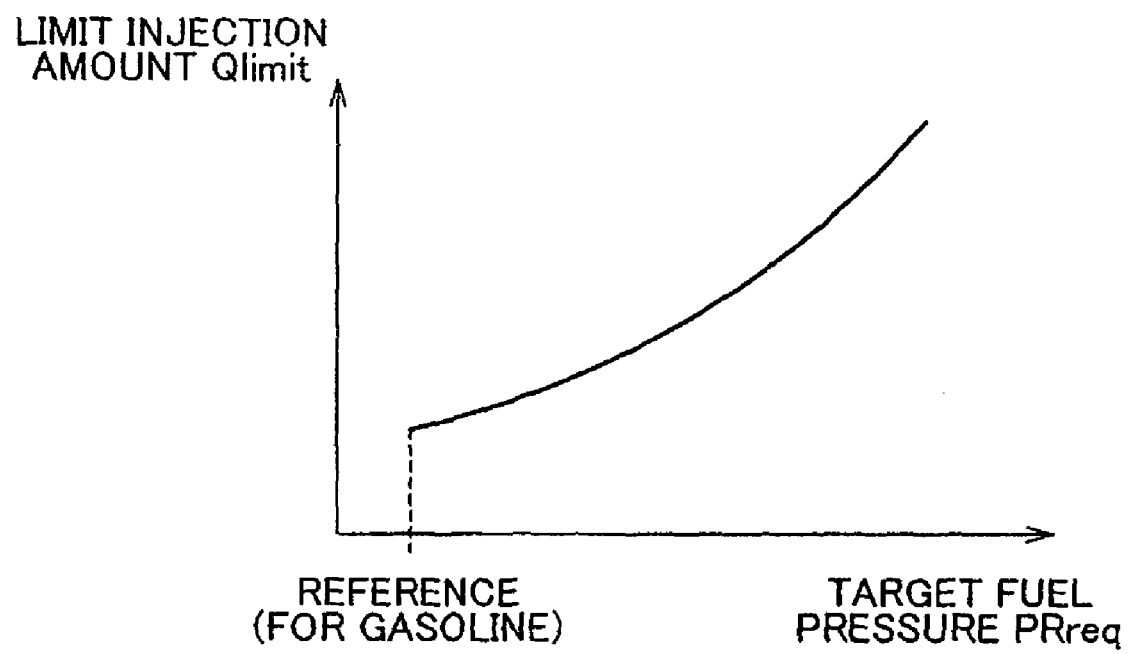
FIG. 9 is a characteristic diagram showing a relationship between the target fuel pressure and the limit injection amount.

Operation process of a control device for an internal combustion engine in accordance with a second embodiment will be described with reference to FIGS. 8 and 9 as well as FIGS. 1 to 7. FIG. 8 is a flowchart showing an output correction process in accordance with the second embodiment. FIG. 9 is a characteristic diagram showing a relationship between the target fuel pressure and the limit injection amount. Incidentally, since a basic construction of the second embodiment may be substantially the same as shown in FIG. 1 and the basic operation other than the output correction process may be substantially the same as shown in FIG. 5, the same constructions and steps are assigned with the same reference characters, and detailed descriptions thereof are appropriately omitted.

According to the second embodiment, even when the intake air amount is restricted as shown in conjunction with the first embodiment, the decline in output can be suitably avoided by increasing the fuel pressure as described in detail below.

Referring to FIG. 8 showing the output correction process in accordance with the second embodiment, firstly, the target fuel pressure map is switched to an alcohol-purpose map by the control device 100 (step S30). That is, in the expectation that the intake air amount is to be restricted, a target fuel pressure that will raise the fuel pressure is read from the target fuel pressure map, and the switching of the target fuel pressure is performed as PRreq=pmreq_alc_map.

Subsequently, a properly injectable limit injection amount is specifically determined as Qlimit=F(PRreq) by the control device 100 (step S31). It is to be noted herein that as shown in FIG. 9, if the target fuel pressure PRreq increases from a reference value (e.g., a value corresponding to 100% gasoline), the properly injectable limit injection amount Qlimit also increases.

After that, as in the foregoing operation shown in FIG. 6, various values are specifically determined, that is, the injection amount coefficient ekrich for the limit injection amount Qlimit (step S22), the intake air amount GAlimit (step S23), the throttle opening degree TAlimit (step S24), and the required throttle opening degree TAreq (step S25) are sequentially determined specifically. Then, it is determined by the control device 100 whether or not TAreq>TAlimit (step S26). If it is determined that the inequality TAreq>TAlimit does not hold (NO in step S26), it is inferred that the injection amount that corresponds to the intake air amount for the required throttle opening degree TAreq is still within the properly injectable range, and therefore the throttle opening degree is not particularly restricted. On the other hand, if it is determined that TAreq>TAlimit (YES in step S26), it is inferred that the injection amount that corresponds to the intake air amount for the required throttle opening degree TAreq will exceed the properly injectable range. Therefore, the required throttle opening degree is restricted as TAreq=TAlimit (step S261).

As described above, according to the second embodiment, the driveability can be suitably secured even in the case where a blended fuel is used. In particular, since the throttle opening degree TAlimit that allows proper fuel injection increases with increases in the target fuel pressure PRreq, the possibility of determining that TAreq>TAlimit (YES in step S26) relatively reduces. Therefore, the decline in output relative to the output produced at the time of 100% gasoline is avoided, so that great advantage in practice is attained.

(3) Third Embodiment

Figure 10:
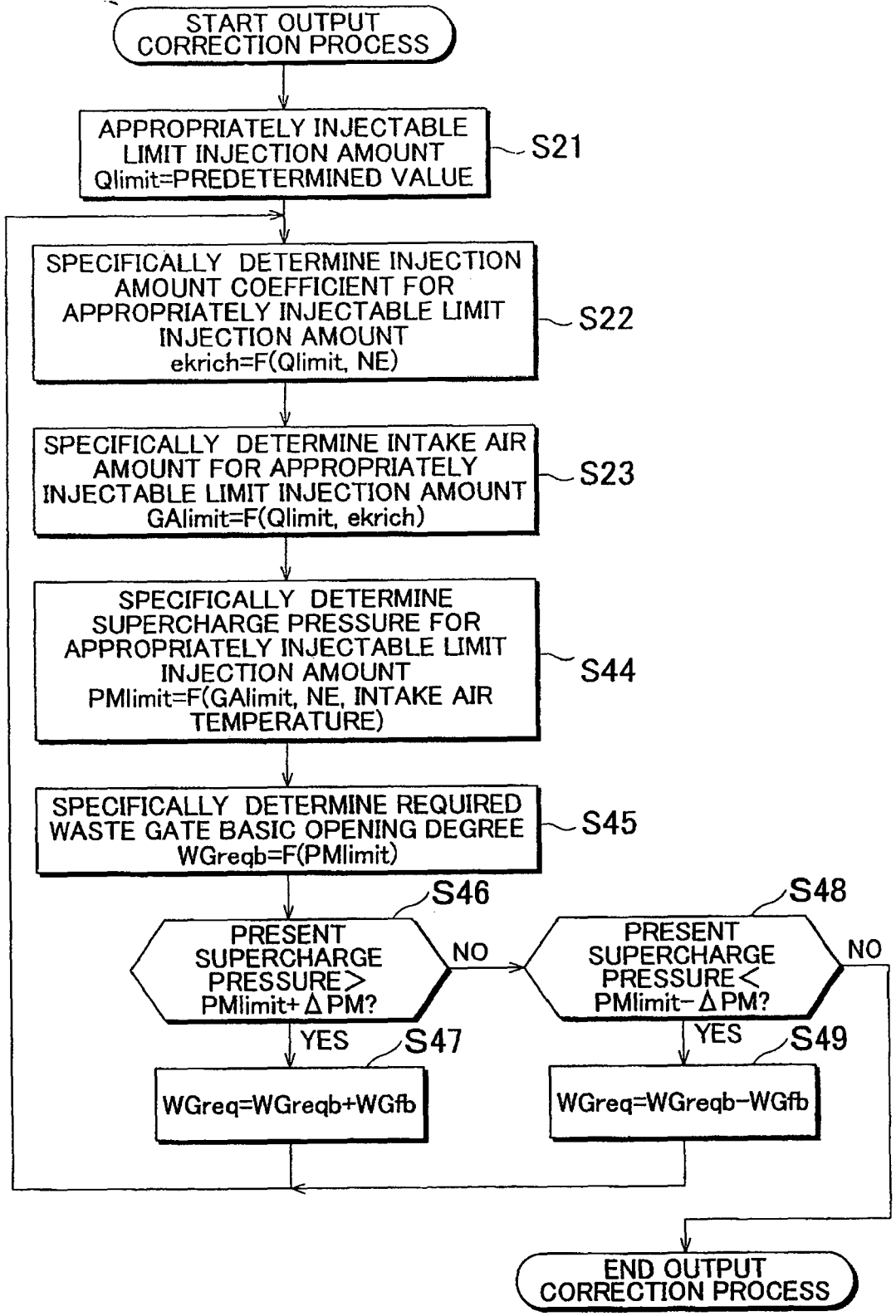
FIG. 10 is a flowchart showing an output correction process in accordance with a third embodiment.

Next, operation processes of a control device for an internal combustion engine in accordance with a third embodiment will be described with reference to FIG. 10 as well as FIGS. 1 to 7. FIG. 10 is a flowchart showing an output correction process in accordance with the third embodiment. Incidentally, since a basic construction of the third embodiment may be substantially the same as shown in FIG. 1 and the basic operation other than the output correction process may be substantially the same as shown in FIG. 5, the same constructions and steps are assigned with the same reference characters, and detailed descriptions thereof are appropriately omitted.

According to the third embodiment, even in the case where a blended fuel is used, it is possible to suitably secure a driveability. Furthermore, because the restriction of the intake air amount is performed via the waste gate valve 12 (or the air bypass valve 14) instead of the throttle valve 214 used in the first embodiment, the pump loss at the throttle valve 214 can be suitably reduced.

In the output correction process in accordance with the third embodiment shown in FIG. 10, as in the process in FIG. 6, the limit injection amount Qlimit that can be properly injected without impairing the linearity is determined as a predetermined value (step S21), and the injection amount coefficient ekrich for the limit injection amount Qlimit (step S22) and the intake air amount GAlimit (step S23) are sequentially specifically determined.

In the third embodiment, in particular, the supercharge pressure at the time of the properly injectable limit injection amount PMlimit=F(GAlimit, NE, intake air temperature) by the control device 100 (step S44). Concretely, the supercharge pressure is determined on the basis of a map in which PMlimit has a positive correlation with GAlimit, or a map in which PMlimit has a negative correlation with the engine rotation speed NE, or a map in which PMlimit has a positive correlation with the intake air temperature, etc.

Subsequently, a required waste gate basic opening degree is specifically determined as WGreqb=F(PMlimit) by the control device 100 (step S45). Concretely, a required waste gate basic opening degree is specifically determined on the basis of a map in which WGreqb has a negative correlation with PMlimit, or the like.

Then, the determination as to whether or not it is permissible to exit the feedback process of converging the present supercharge pressure to the PMlimit, in the following manner. That is, it is firstly determined by the control device 100 whether or not the present supercharge pressure>PMlimit+ΔPM (step S46). It is advisable that ΔPM be determined beforehand as a margin that is practically allowed in conjunction with the PMlimit, from experiences, experiments, simulations, etc. If it is determined that the present supercharge pressure>PMlimit+ΔPM (YES in step S46), it means that the present supercharge pressure is excessively larger than PMlimit. Therefore, in order to lower the supercharge pressure by relatively opening the waste gate, the required waste gate basic opening degree is determined as WGreq=WGreqb+WGfb (step S47), and the foregoing process is performed again starting with the process of step S22, in a feedback fashion.

On the other hand, if it is determined that the inequality present supercharge pressure>PMlimit+ΔPM does not hold (NO in step S46), it is subsequently determined whether of not the present supercharge pressure<PMlimit−ΔPM (step S48). If it is determined that the present supercharge pressure<PMlimit−ΔPM (YES in step S48), it means that the present supercharge pressure is excessively smaller than PMlimit. Therefore, in order to increase the supercharge pressure by relatively closing the waste gate, the required waste gate basic opening degree is determined as WGreq=WGreqb−WGfb (step S49), and the foregoing process is performed again starting with the process of step S22 in a feedback fashion.

On the other hand, if it is determined that the inequality present supercharge pressure<PMlimit−ΔPM does not hold (NO in step S48), it means that the present supercharge pressure has converged within a permissible range from PMlimit, and therefore the current output correction process is ended.

Incidentally, although the waste gate valve 12 is used in the above-described embodiment, the air bypass valve 14 may also be used instead.

As described above, according to the third embodiment, the driveability can be suitably secured even in the case where a blended fuel is used. In particular, since the restriction of the intake air amount is performed via the waste gate valve 12 (or the air bypass valve 14) instead of the throttle valve 214, the pump loss at the throttle valve 214 can be suitably reduced, so that great advantage in practice is achieved.

(4) Fourth Embodiment

Figure 11:
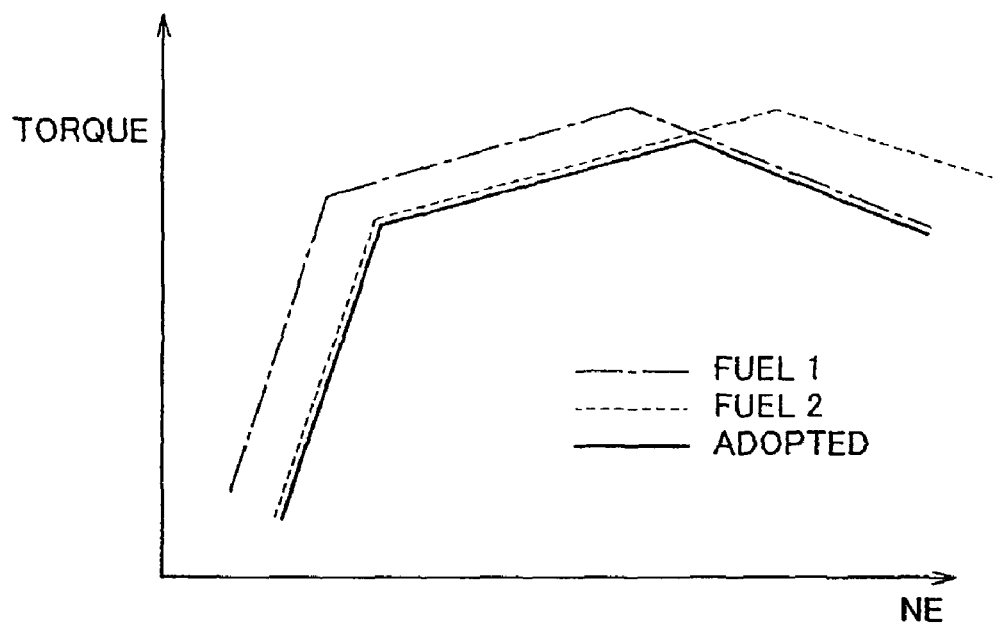
FIG. 11 is a characteristic diagram showing a relationship the engine rotation speed and the torque.
Figure 12:
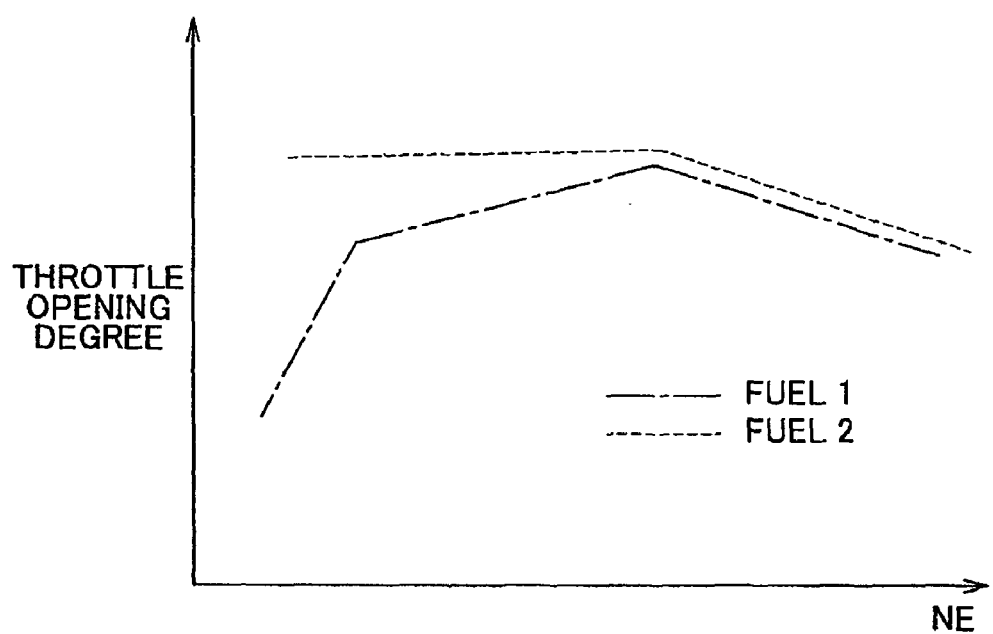
FIG. 12 is a throttle opening degree map (during full performance) in the case where the output is made constant by the restriction of the throttle opening degree.
Figure 13:
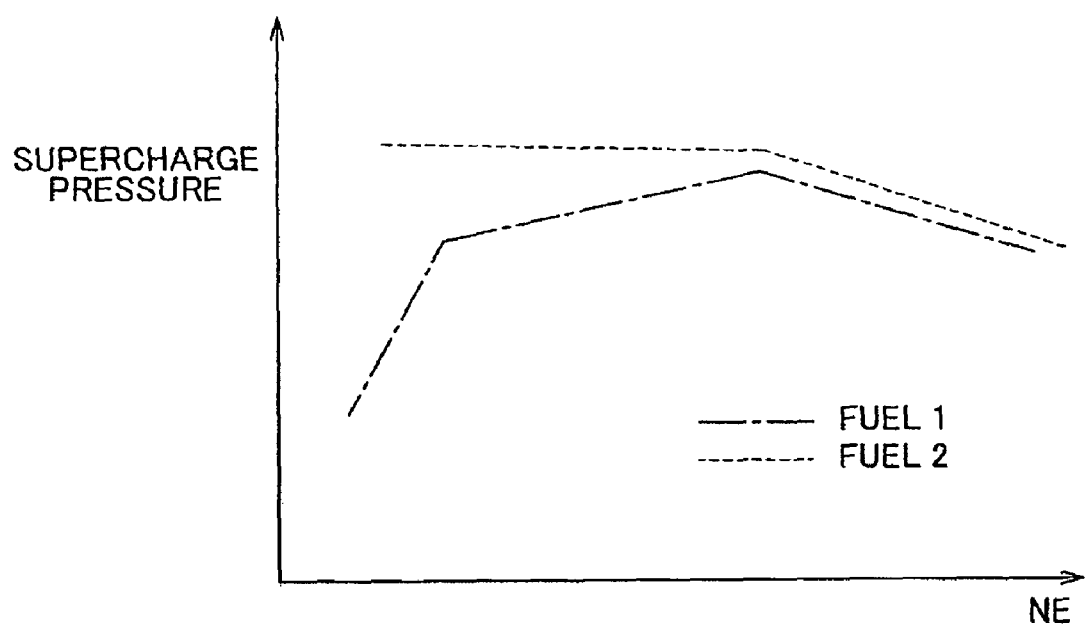
FIG. 13 is a throttle opening degree map (during full performance) in the case where the output is made constant by the restriction of the supercharge pressure.

Next, a construction and operation processes of a control device for an internal combustion engine in accordance with a fourth embodiment will be described with reference to FIGS. 11 to 13 as well as FIGS. 1 to 10. FIG. 11 is a characteristic diagram showing a relationship between the engine rotation speed and the torque. FIG. 12 is a throttle opening degree map (at the time of full performance) in the case where the output is made constant by restricting the throttle opening degree. FIG. 13 is a throttle opening degree map (at the time of full performance) in the case where the output is made constant by restricting the supercharge pressure. Incidentally, since a basic construction of the fourth embodiment may be substantially the same as shown in FIG. 1 and the basic operation may be substantially the same as shown in FIG. 6, 8 or 11, the same constructions and steps are assigned with the same reference characters, and detailed descriptions thereof are appropriately omitted.

The fourth embodiment concerns an output correction process (see step S13 in FIG. 5) at the time of WOT of an internal combustion engine that uses a blended fuel obtained by blending a plurality of kinds of fuels. In general, if a plurality of kinds of fuels are blended, the fuel properties (octane number, equivalence ratio, etc.) of the fuels vary, so that the producible output differs depending on the blend proportions of the fuels. This is because if the octane numbers vary, the settable ignition timings also vary. In addition, if the equivalence ratios vary, there occur cases where the injection amount or the output has to be restricted with regard to a range that cannot be covered by the high-rotation-speed region or the like even if the dynamic range of the fuel injection valve is made wide so as to realize the injection amounts of fuels that vary from a fuel with a large equivalence ratio to a fuel with a small equivalence ratio. If such output differences occur, the design strength of the engine 200, the adjustment of the driveability, etc. are affected, so that accompanying problems mentioned below can occur. That is, if a strength-improved design in accordance with the maximum outputs of the fuels is adopted, a strength greater than necessary results, so that the friction loss increases, thus giving rise to a possibility of incurring deterioration of the fuel economy. Large amounts of time and labor are needed in order to adjust the speed change ratio, the speed shift timing, the torque at the time of shift, with regard to the entire blend proportions assumed for each fuel. Therefore, in the output correction process in accordance with the fourth embodiment, the output at the time of WOT is made constant regardless of the blend proportions of the fuels used, as shown in FIG. 1.

In FIG. 11, two kinds of dashed lines represent maps of the cases where a fuel 1 or fuel 2 alone is used, respectively, and a solid line represents a map adopted in the embodiment. The fuel 1 is, for example, an ethanol fuel whose octane number is 110 and whose heat generation amount is 7000 kcal/kg. The fuel 2 is, for example, a gasoline fuel whose octane number is 91 and whose heat generation amount is 11000 kcal/kg. As shown by the solid line in FIG. 11, in the foregoing output correction process (see step S13 in FIG. 5) in the fourth embodiment, the output is corrected in conformation with the output produced during a state in which, among the blend proportions of the assumed fuels used in a blended fuel, a blend proportion that brings about the lowest performance is obtained. In other words, with regard to the engine rotation speed in FIG. 11, a map for one of the fuel 1 and the fuel 2 that produces less torque is adopted in accordance with the rotation speed. For example, in FIG. 11, in a low-rotation speed region, the map of the fuel 2 is adopted. On the other hand, in a high-rotation speed region, the map of the fuel 1 is adopted. Then, the output correction process is performed so as to produce an output that conforms to the adopted map.

More specifically, since the output performance is determined by the energy amount ($\approx$the intake air amount+the fuel injection amount) and the combustion efficiency ($\approx$how close to the ignition timing MBT (minimum advance for best torque) that provides the largest torque the ignition timing can be brought. Therefore, as shown below, the intake air amount is appropriately restricted in accordance with the fuel property and the operation region. Thus the output correction process is performed.

Firstly, in the case where the blend proportion of a high-octane-number fuel is large, the intake air amount is restricted in the low rotation speed region. Generally, the larger the blend proportion of a high-octane-number fuel, the more the fuel efficiency improves. This tendency is more remarkable in the low rotation speed region, in which knocking (abnormal combustion) tends to occur, than in the high rotation speed region. Therefore, in the case of a large blend proportion of a high-octane-number fuel and the low rotation speed region, the intake air amount, which a part of the energy amount, is restricted so as to restrict the energy amount by an amount that corresponds to the improvement in the combustion efficiency. This makes the output constant.

In the case where the blend proportion of a low-heat-generation fuel is large, the intake air amount is restricted in the high rotation speed region. It is to be noted herein that generally, since the low-heat-generation fuel requires that the injection amount be increased, the following phenomena occur. Firstly, the heat capacity rises, and the exhaust gas temperature declines, and the excessive fuel increase is suspended, and the combustion efficiency improves. Secondary, the effect of the latent heat of the injected fuel cooling the fresh air improves, so that knocking is prevented (i.e., the combustion efficiency improves), and also so that the volume of the fresh air decreases (that is, the intake air amount increases and the energy amount increases). Thirdly, in the case of in-cylinder injection, the disturbance in the cylinder caused by the injected fuel increases, and therefore the combustion efficiency improves. In particular, in the high rotation speed region, the first phenomenon remarkably manifests itself, and the combustion efficiency improves; therefore, the output tends to increase. Therefore, in order to restrict the energy amount by an amount that corresponds to the improvement in the combustion efficiency on the basis of the first phenomenon, the intake air amount is restricted in the case of a large blend proportion of the low-heat-generation fuel and a high rotation speed region. This makes the output constant.

As described above, by restricting the intake air amount in accordance with the operation region and the blend proportions of fuels, the output correction process is performed, so that even if the blend proportions of the fuel change, the output at the time of WOT can be stabilized.

The output correction process described above can be realized by, for example, restricting the throttle opening degree or the supercharge pressure. This output correction process will be described with reference to FIGS. 12 and 13.

In FIG. 12, a map of the throttle opening degree in the case where the blend proportion of the fuel 1 is large and a map of the throttle opening degree in the case where the blend proportion of the fuel 2 is large are represented by two kinds of lines, that is, a one-dot chain line and a dotted line, respectively. Since the fuel 1 is higher in octane number than the fuel 2, the throttle opening degree during the low rotation speed region in the case where the blend proportion of the fuel 1 is large is restricted more, that is, restricted to a smaller degree of opening, than the throttle opening degree during the low rotation speed region in the case where the blend proportion of the fuel 2 is large. Concretely, when in step S24 in FIG. 6 or FIG. 8 the throttle opening degree for the limit injection amount Qlimit is specifically determined as TAlimit=F(GAlimit, NE), the throttle opening degree TAlimit is specifically determined in accordance with the map as shown in FIG. 12.

Or, in FIG. 13, a map of the supercharge pressure in the case where the blend proportion of the fuel 1 is large and a map of the supercharge pressure in the case where the blend proportion of the fuel 2 is large are represented by two kinds of lines, that is, a one-dot chain line and a dotted line, respectively. Since the fuel 1 is higher in octane number than the fuel 2, the supercharge pressure determined by the control of the throttle opening degree during the low rotation speed region in the case where the blend proportion of the fuel 1 is large is restricted more, that is, restricted to a smaller throttle opening degree, than the supercharge pressure determined by the control of the throttle opening degree during the low rotation speed region in the case where the blend proportion of the fuel 2 is large. Concretely, when in step S44 in FIG. 10 the supercharge pressure for the properly injectable limit injection amount is specifically determined as PMlimit=F(GAlimit, NE, intake air temperature) by the control device 100, the supercharge pressure. PMlimit is specifically determined in accordance with the map as shown in FIG. 13.

As described above, according to the fourth embodiment, since the intake air amount is restricted in accordance with the operation region and the blend proportions of fuels so that the output at the time of WOT can be made constant, the driveability can be suitably secured even in the case where a blended fuel is used.

The invention is not limited to the foregoing embodiments, examples or the like. On the contrary, the invention is suitably changed without violating the gist or spirit of the invention that can be interpreted from the appended claims and the entire description. The control devices for internal combustion engines that encompass such changes are also included within the technical scope of the invention.

The invention claimed is:

1. A control device for an internal combustion engine, comprising:
a fuel injection device that injects a fuel in accordance with a required injection amount that is required for combustion in a combustion chamber that is performed to produce an output of the internal combustion engine;
a fuel property specific determination device that specifically determines a fuel property of the fuel injected;
a control device that performs an output correction process of controlling at least a portion of the internal combustion engine so as to correct the produced output based on a difference in the specifically determined fuel property; and
a prediction device that predicts that there is a possibility that the produced output will decline or become unstable if the required injection amount is in a high injection amount region above a limit injection amount of the fuel injection device that is a maximum amount in a range of fuel injection amount properly injected while a linearity of the injection amount is secured, wherein
if it is predicted that during the high injection amount region, the output corresponding to the required injection amount will decline, the control device performs the output correction process so that the output corresponding to the limit injection amount becomes an upper limit of the produced output.

2. The control device according to claim 1, wherein the portion of the internal combustion engine is at least one of component parts that change the intake air amount, component parts that change the injection amount of fuel, and component parts that change an ignition timing.

3. The control device according to claim 1, further comprising a supplementary device that at least partially offsets a reduction in the output when the output is predicted to decline.

4. The control device according to claim 3, wherein the supplementary device at least partially offsets the reduction in the output by raising a fuel pressure of the fuel injected.

5. The control device according to claim 1, further comprising an adjustment device that adjusts an intake air amount that is an amount of air taken into the combustion chamber,
wherein the control device performs the output correction process by controlling the adjustment device so as to increase or decrease the intake air amount.

6. The control device according to claim 5, wherein the adjustment device adjusts the intake air amount by adjusting an opening area of an intake pipe that is a passageway of the air taken in.

7. The control device according to claim 5, further comprising a supercharge device that supercharges the air taken in,
wherein the adjustment device adjusts the intake air amount by adjusting an amount of air of the air taken in that bypasses the supercharge device.

8. The control device according to claim 5, further comprising a supercharge device that supercharges the air taken in by using an exhaust gas associated with the combustion,
wherein the adjustment device adjusts the intake air amount by adjusting an amount of exhaust gas of the exhaust gas that bypasses the supercharge device.

9. The control device according to claim 1, wherein if it is specifically determined in terms of the fuel property that a blend proportion of a fuel that has a high octane number above a predetermined octane number threshold value, of a plurality of fuels blended in the fuel injected, exceeds a predetermined blend proportion threshold value, the control device performs the output correction process during a low rotation speed region below a predetermined rotation speed threshold value.

10. The control device according to claim 1, wherein if it is specifically determined in terms of the fuel property that a blend proportion of a fuel that is a low-heat-generation fuel whose heat generation amount is below a predetermined heat generation amount, of a plurality of fuels blended in the fuel injected, exceeds a predetermined blend proportion threshold value, the control device performs the output correction process during a high rotation speed region above a predetermined rotation speed threshold value.

11. The control device according to claim 1, wherein the control device performs the output correction process so that a relatively low output of outputs that are assumed regarding each of the plurality of fuels blended in the fuel injected is produced.

12. The control device according to claim 11, wherein the control device performs the output correction process so that a lowest output of the outputs that are assumed regarding each of the plurality of fuels blended in the fuel injected is produced.

13. The control device according to claim 1, wherein the fuel property specific determination device specifically determines the fuel property based on an air-fuel ratio of an exhaust gas associated with the combustion.

14. The control device according to claim 1, wherein the fuel property specific determination device specifically determines the fuel property based on an output value of a fuel property sensor provided for a fuel tank that stores the fuel.

15. A control method for an internal combustion engine, comprising:

- injecting a fuel in accordance with a required injection amount that is required for combustion in a combustion chamber that is performed to produce an output of the internal combustion engine;
- specifically determining a fuel property of the fuel injected;
- performing an output correction process of controlling at least a portion of the internal combustion engine so as to correct the produced output based on a difference in the specifically determined fuel property;
- predicting that there is a possibility that the produced output will decline or become unstable if the required injection amount is in a high injection amount region above a limit injection amount that is a maximum amount in a range of fuel injection amount that can be properly injected while a linearity of the injection amount is secured; and
- performing the output correction process so that the output corresponding to the limit injection amount becomes an upper limit of the produced output if it is predicted that during the high injection amount region, the output corresponding to the required injection amount will decline.

16. The control method according to claim 15, wherein performing the output correction process during a low rotation speed region below a predetermined rotation speed threshold value if it is specifically determined in terms of the fuel property that a blend proportion of a fuel that has a high octane number above a predetermined octane number threshold value, of a plurality of fuels blended in the fuel injected, exceeds a predetermined blend proportion threshold value.

17. The control method according to claim 15, wherein performing the output correction process during a high rotation speed region above a predetermined rotation speed threshold value if it is specifically determined in terms of the fuel property that a blend proportion of a fuel that is a low-heat-generation fuel whose heat generation amount is below a predetermined heat generation amount, of a plurality of fuels blended in the fuel injected, exceeds a predetermined blend proportion threshold value.

18. The control method according to claim 15, wherein performing the output correction process so that a relatively low output of outputs that are assumed regarding each of the plurality of fuels blended in the fuel injected is produced.

19. The control method according to claim 15, wherein specifically determining the fuel property based on an air-fuel ratio of an exhaust gas associated with the combustion.

* * * * *